United States Patent [19]
Philipsen

[11] 4,120,212
[45] Oct. 17, 1978

[54] FORWARD-REVERSE INTERLOCK FOR A TRANSMISSION

[75] Inventor: R. Dale Philipsen, Peoria, Ill.

[73] Assignee: Caterpillar Tractor Co., Peoria, Ill.

[21] Appl. No.: 844,551

[22] Filed: Oct. 25, 1977

[51] Int. Cl.² .............................................. G05G 5/10
[52] U.S. Cl. ........................................ 74/476; 74/477
[58] Field of Search .................. 74/476, 477, 878; 192/3.63

[56] References Cited

U.S. PATENT DOCUMENTS

| | | | |
|---|---|---|---|
| 1,758,597 | 5/1930 | Ford | 74/477 X |
| 2,056,367 | 10/1936 | Robbins et al. | 74/477 |
| 2,438,455 | 3/1948 | Roeder et al. | 74/477 |
| 2,438,691 | 3/1948 | Armantrout | 74/477 |
| 2,531,701 | 11/1950 | Price | 74/477 X |
| 3,104,558 | 9/1963 | Herr, Jr. | 74/477 |

Primary Examiner—Allan D. Herrmann
Attorney, Agent, or Firm—Phillips, Moore, Weissenberger, Lempio & Majestic

[57] ABSTRACT

A shift interlock for a multi-speed transmission controlled by a speed lever and a directional lever is disclosed which prevents inadvertent operation of the directional control feature while the transmission is in the high gear ratios. The interlock is comprised of a pair of lock pins disposed between a first and second shift rod and having a length longer than the distance separating the shift rods. Each shift rod defines a plurality of grooves thereabout to receive the lock pins. One rod is movable in a first or a second direction to urge at least one of the lock pins into one of the annular grooves of the second rod to prevent reciprocation of the second shift rod. The second shift rod is reciprocable only with the first shift rod in the neutral position.

4 Claims, 6 Drawing Figures

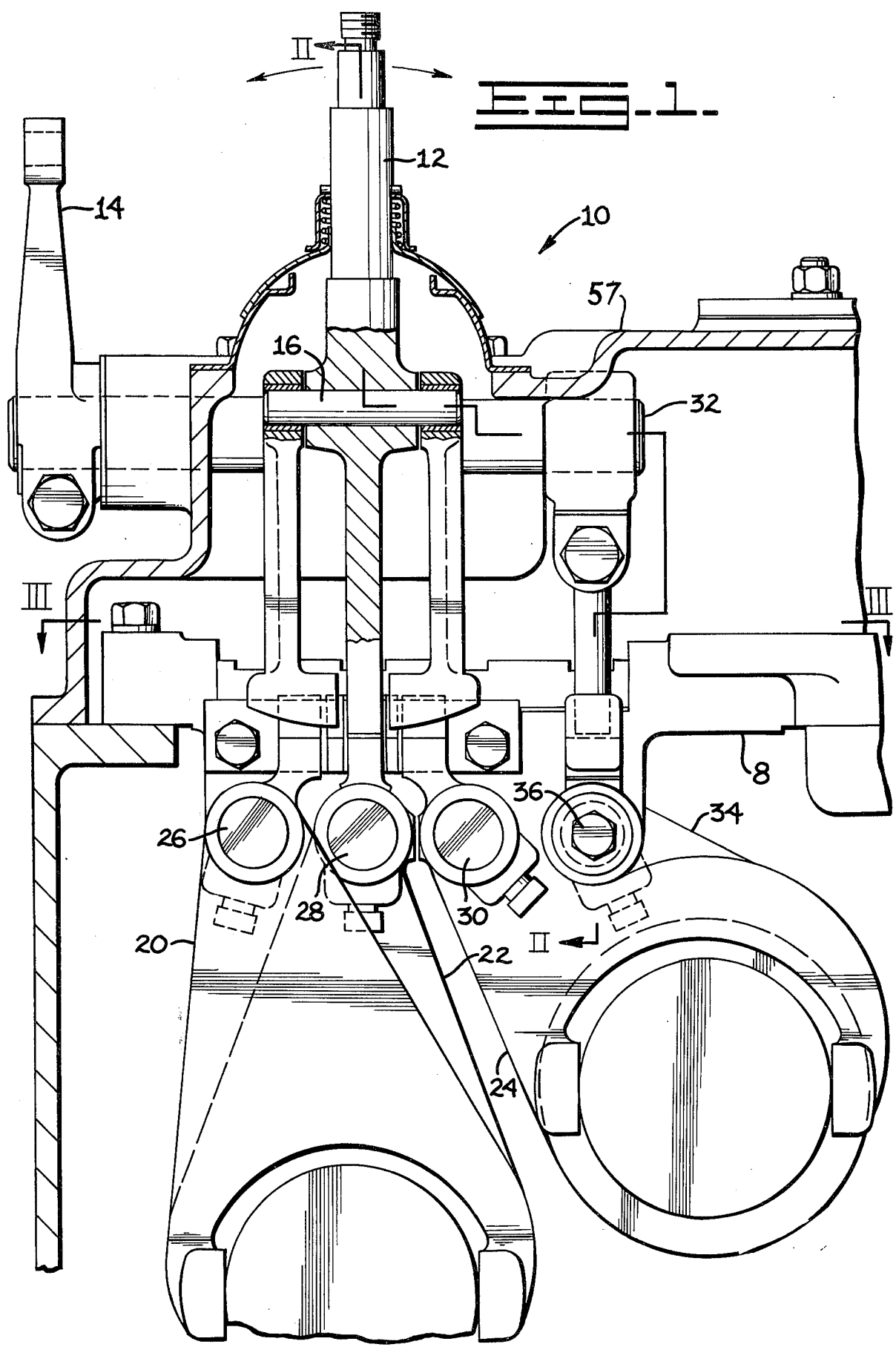

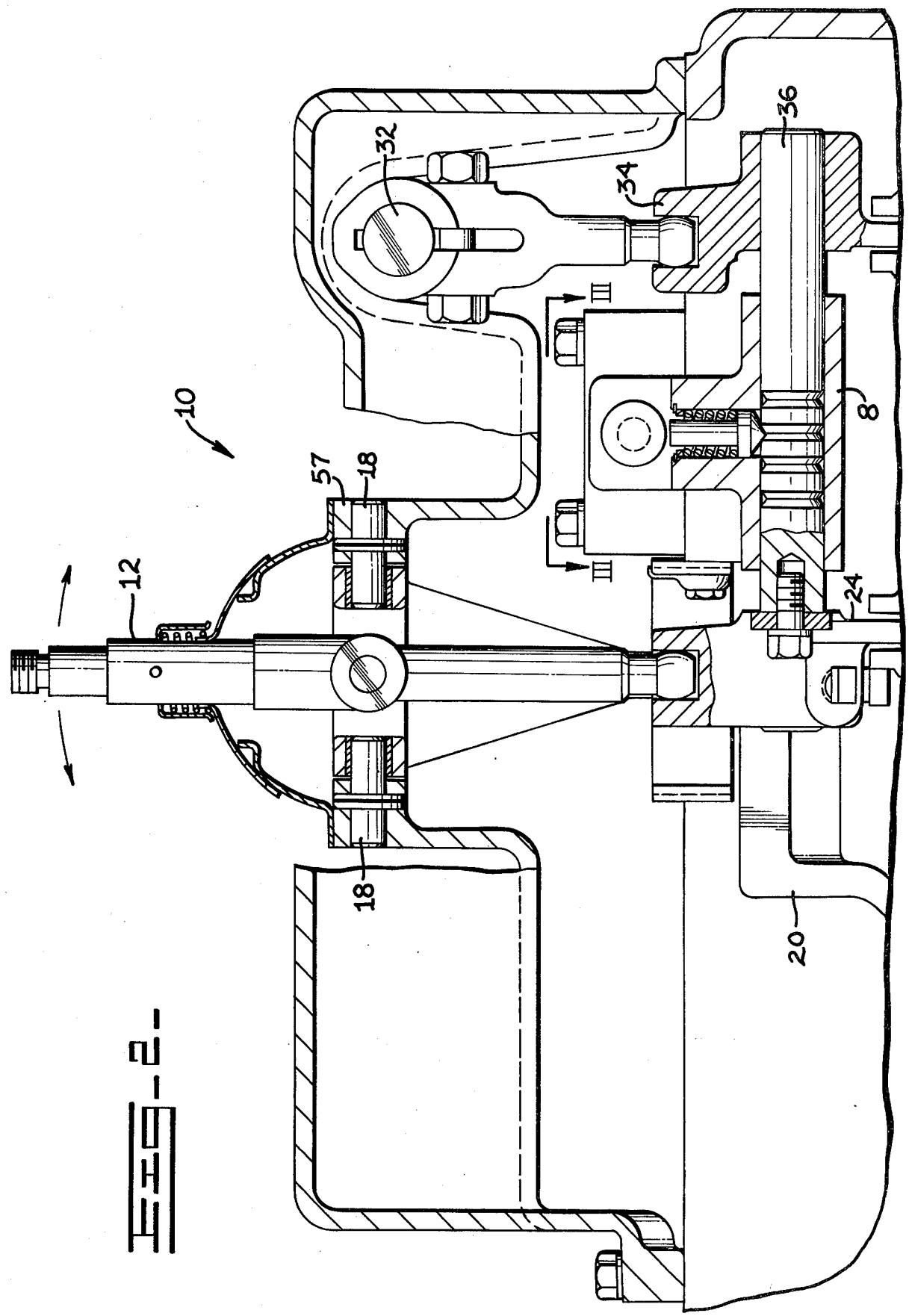

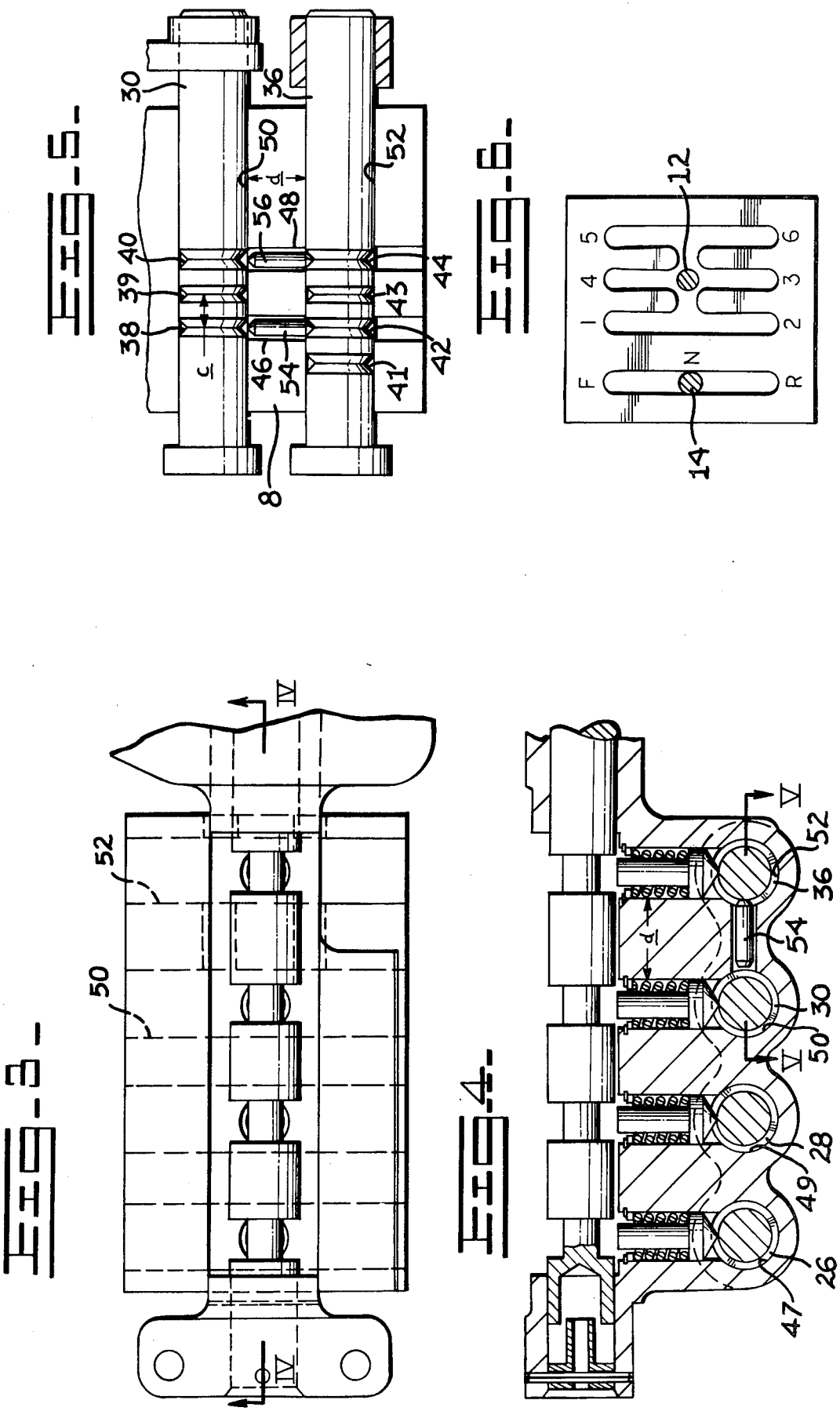

FORWARD-REVERSE INTERLOCK FOR A TRANSMISSION

BACKGROUND OF THE INVENTION

This invention relates to a shift control arrangement in a multi-speed transmission. In particular, it relates to a means for preventing inadvertent selection of a reverse direction while a high gear ratio has been selected. The control system envisioned operates with two levers, one lever is operable through a gating plate to select the direction, while the second lever is operable through a similar gating plate to select the speed.

In multi-speed transmissions, particularly those associated with construction equipment, it is known to provide several speeds in both forward and reverse operation while providing additional speeds in the forward range only. The additional forward range speeds are usually provided through the higher gear ratios and are selectable by the operator through a single speed control lever. Systems are available wherein selection of a reverse mode at the higher gear ratios is possible at the shift lever, while actual engagement is prevented due to interlocking means in the transmission. That is to say, an inexperienced operator in a heavy construction vehicle could shift from the forward to the reverse mode while operating in the high gear ratio expecting the transmission to shift, while in reality the transmission is constructed so that such a shift does not occur. It should be readily apparent that this condition could be detrimental to operation of the vehicle. Similarly, an inexperienced operator could place the transmission controls in the higher gear ratios and select a reverse direction before starting and find the vehicle will only operate in the forward direction.

It is, therefore, appropriate to provide a means to prevent an inexperienced operator from selecting a reverse direction while the vehicle is operating in the higher gear ratio to correspond to the already limited transmission which will not engage the reverse direction in the higher gear ratio.

SUMMARY OF THE INVENTION

Accordingly, this invention provides a shift interlock for a transmission gear shift control system having a pair of shift forks. The shift interlock is comprised of a mounting defining a pair of parallel-arranged bores separated by a first predetermined distance. A first rod is operably connected to one of the shift forks and is reciprocably disposed in one of the parallel bores and further defines thereabout three circumferential annular grooves. Each annular groove is separated one from the next by a second predetermined distance. A second rod is operably connected to the other of the shift forks and is reciprocably disposed in the other of the parallel bores. The second rod defines thereabout four circumferential annular grooves, each separated one from the next by the same second predetermined distance. The mounting further defines a pair of lock pin bores normal to and interconnecting the aforedescribed parallel-arranged bores. The lock pin bores are separated one from the other by a third predetermined distance, substantially equal to twice the second predetermined distance. A pair of lock pins are provided and each disposed in one of the lock pin bores. The lock pins have a length greater than the first predetermined distance. The first rod is movable from a neutral position in a first direction or a second direction to urge at least one of the lock pins into one of the four annular grooves of the second rod to prevent reciprocation of the second rod from a neutral position. The second rod is reciprocable in first and second directions only with the first rod in the aforedescribed neutral position.

BRIEF DESCRIPTION OF THE DRAWINGS

FIG. 1 is an elevation of the transmission shift mechanism wherein the concept of this invention has been embodied.

FIG. 2 is a side elevation of the shift mechanism depicted in FIG. 1.

FIG. 3 is a plan view of a portion of the shift mechanism shown in section in FIG. 2 taken at line III—III.

FIG. 4 is a sectional view of the shift rods of the transmission taken at line IV—IV of FIG. 3.

FIG. 5 is a sectional view of the forward and reverse and the high gear ratio shift rods taken at line V—V in FIG. 4.

FIG. 6 is a representative shift gate plate for the transmission depicted herein.

DETAILED DESCRIPTION OF THE PREFERRED EMBODIMENT

Referring to FIG. 1, a transmission control system 10 wherein this invention is applicable is depicted. It should be understood that the transmission control system, depicted in FIGS. 1 and 2, is representative only. This transmission control system includes a speed selector lever 12 and a directional selector lever 14. Lever 12 is pivoted in the usual manner by a first pivot shaft 16 and a second pivot shaft 18 to provide movement in the plane of FIG. 1 and also movement in the plane of FIG. 2. Shift lever 12 is operable to move one of a plurality of shift forks 20, 22, or 24. Each shift fork is associated with a shift rod 26, 28, and 30, respectively, with the shift rods 26, 28, and 30 mounted for reciprocation in parallel arranged bores 47, 49, and 50 in housing 8.

Directional selector lever 14 is rotatably mounted in housing 57 of the transmission control system 10, which also houses speed selector lever 12. Directional selector lever 14 is operable to rotate a shaft 32 which in turn operates a shift fork 34, which, in this transmission, is operable to select the direction of the vehicle. Shift fork 34 is reciprocably associated with a shift rod 36 which in turn is mounted in a longitudinal bore 52 of housing 8 in a parallel arrangement with shift rod 30. Shift rod 30 and 36 are separated one from the other a predetermined distance indicated $d$ on FIGS. 4 and 5 and hereafter called a first predetermined distance.

Referring to FIG. 5, shift rod 30 is formed with three annular grooves 38, 39, and 40 which may have a V-shaped configuration, although other configurations might be appropriate. As can be seen, groove 38 is separated from groove 39, and groove 39 from groove 40, by a land. The grooves have substantially equal center-to-center spacing indicated $c$ and hereafter called a second predetermined distance. Similarly, shift rod 36 is configured with four annular grooves 41, 42, 43, and 44. The successive annular grooves 38 through 44 each have center-to-center spacing equal to the same second predetermind distance.

Again referring to FIG. 5, housing 8 is formed with two lock pin bores 46 and 48, each interconnecting a bore 50 defined in housing 8 and having disposed therein shift rod 30 with a bore 52 also defined in housing 8 and having disposed therein shift rod 36. A lock pin 54 is disposed in lock pin bore 46 while a similar lock pin 56 is disposed in lock pin bore 48. Each of the lock pins 54 and 56 is purposely made longer than the separating distance between bores 50 and 52; in other words, longer than said first predetermined distance. The ends of the lock pins 54 and 56 take on essentially the same configuration as the shape of the grooves 38 through 44, in this case, a V-shaped or conical end. Preferably lock pins 54 and 56 have a total length equal to distance $d$ plus the depth of one of the annular grooves 38-44. The grooves all have equal depths. The shift rods 30 and 36 are disposed in bores 50 and 52, respectively, so that the pins 54 and 56 disposed in bores 46 and 48 may engage annular grooves 38 and 40 respectively. Thus, the distance between bores 46 and 48 is determined as twice the second predetermined distance. Similarly, shift rod 36, when disposed in bore 52, is positioned so that lock pin 54 engages groove 42, while lock pin 56 engages groove 44, while the transmission is in the neutral position.

It should be noted that for assembly of the aforedescribed interlock mechanism housing 8 is configured so that bores 46 and 48 extend outwardly past bore 52 to allow insertion of lock pins 46 and 56 prior to the positioning of shift rod 36.

In operation, selection of a direction by positioning of the lever 14 either in the R or F position as indicated in FIG. 6 may be accomplished by movement in the gate depicted in FIG. 6 with consequent movement of shift rod 36. Now, assume shift rod 36 is moved rightwardly from the neutral position shown in FIG. 5 to select a forward direction. In this position, groove 43 will align with lock pin 56 and groove 41 with lock pin 54. The shift rod 30 is associated with the higher ratios, or the fifth and sixth ratio in this particular configuration. As can be seen, shift rod 30 is disposed adjacent shift rod 36 so that selection of the fifth ratio, as shown in FIG. 5, causes shift rod 30 to move leftwardly so that lock pin 56 is out of alignment with annular groove 40. With this condition, shift rod 36 cannot move leftwardly from the assumed forward position nor from the neutral position depicted in FIG. 5, for, in order to so so, lock pin 56 would have to move into the bore 50. This is prevented by shift rod 30 as just described. A similar analysis may be made upon shifting shift rod 30 to the right from the neutral position shown in FIG. 5.

On the other hand, if shift rod 36, which is shown in FIG. 5 in the neutral position, is moved leftwardly to engage the reverse direction, lock pin 56 is urged into groove 40 with the shift rod 30 in the neutral position, as shown in FIG. 5. Subsequent movement of shift rod 30 by operation of speed control lever 12 is prevented by the lock pin 56 being unable to move inwardly of bore 52. Finally, moving shift rod 36 to the right to select a forward direction as shown in FIG. 5, and with shift rod 30 in the neutral position has no inhibiting effect on subsequent movement of shift rod 30. Thus it can be seen that the floating pins 54 and 56 prevent a reverse selection by the transmission control system while the higher gear ratos have been selected. Similarly, the floating pins 54 and 56 prevent a higher speed ratio from being selected with the directional shift rod 36 positioned in the reverse position.

Embodiments of the invention in which an exclusive property or privilege is claimed are defined as follows:

1. A shift interlock for a transmission gear shift control system having a pair of shift forks, the shift interlock comprising:

a housing defining a pair of substantially parallel bores separated by a first predetermined distance;

a first rod operably connected to one of said shift forks, said first rod reciprocably disposed in one of said parallel bores and defining thereabout three circumferential annular grooves each spaced on from the next a second predetermined distance center-to-center;

a second rod operably connected to the other of said shift forks and reciprocably disposed in the other of said parallel bores, the second rod defining thereabout four circumferential annular grooves each spaced one from the next the same second predetermined distance center-to-center;

said housing further defining a pair of lock pin bores normal to and interconnecting said parallel bores, said lock pin bores having a center-to-center spacing equal to twice said second predetermined distance;

and a pair of lock pins each disposed in one of said lock pin bores and having a length greater than said first predetermined distance;

said first rod movable from a neutral position in a first direction or a second direction to urge at least one of said lock pins into one of the four annular grooves of said second rod to prevent reciprocation of said second rod, said second rod reciprocable from a neutral position in the same first and second directions only with said first rod in the neutral position.

2. The shift interlock of claim 1 wherein the annular grooves defined about each rod have a first depth and, further, wherein each lock pin has a length substantially equal to the sum of the first predetermind distance and said first depth.

3. The shift interlock of claim 2 wherein the gear shift control system includes a third shift fork and, further, wherein the housing defines a third parallel bore so that said one and the other parallel bores and said third parallel-arranged bores have longitudinal axes lying in the same plane; and the shift interlock further comprising a third rod reciprocably disposed in said third parallel bore and movable in the same first and second directions while said second rod is moved in either the first or the second direction.

4. The shift interlock of claim 3 further comprising first lever means for reciprocally moving the first and third rods; and the second lever means for reciprocally moving the second rod.

* * * * *